US012585813B2

(12) United States Patent
Krishnan et al.

(10) Patent No.: US 12,585,813 B2
(45) Date of Patent: Mar. 24, 2026

(54) COMBINING ALLOWLIST AND BLOCKLIST SUPPORT IN DATA QUERIES

(71) Applicant: Oracle International Corporation, Redwood Shores, CA (US)

(72) Inventors: Padmanabhan Krishnan, Brisbane (AU); Kostyantyn Vorobyov, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 51 days.

(21) Appl. No.: 18/670,689

(22) Filed: May 21, 2024

(65) Prior Publication Data

US 2025/0363234 A1 Nov. 27, 2025

(51) Int. Cl.
*G06F 21/62* (2013.01)
*G06F 16/2455* (2019.01)

(52) U.S. Cl.
CPC .... *G06F 21/6227* (2013.01); *G06F 16/24565* (2019.01)

(58) Field of Classification Search
CPC .......... G06F 21/50; G06F 21/51; G06F 21/52; G06F 21/55; G06F 21/56; G06F 21/566; G06F 21/62; G06F 21/6227; G06F 16/24565
See application file for complete search history.

(56) References Cited

U.S. PATENT DOCUMENTS

| | | | | |
|---|---|---|---|---|
| 11,762,978 | B1 * | 9/2023 | Chintala | ................. G06F 21/53 |
| 2009/0063452 | A1 * | 3/2009 | Ahn | ....................... G06F 16/735 |
| | | | | 707/999.005 |
| 2014/0283055 | A1 * | 9/2014 | Zahran | ................. G06F 16/353 |
| | | | | 726/23 |
| 2021/0056956 | A1 * | 2/2021 | Dimitriadis | ......... G10L 15/1815 |
| 2022/0294754 | A1 * | 9/2022 | Rozenbaum | .......... H04L 51/216 |

OTHER PUBLICATIONS

Merz, S. (2001). Model Checking: A Tutorial Overview. In: Cassez, F., Jard, C., Rozoy, B., Ryan, M.D. (eds) Modeling and Verification of Parallel Processes. MOVEP 2000. Lecture Notes in Computer Science, vol. 2067. Springer, Berlin, Heidelberg. https://doi.org/10.1007/3-540-45510-8_1, Jan. 1, 2001, 34 pages.

(Continued)

*Primary Examiner* — Malcolm Cribbs

(74) *Attorney, Agent, or Firm* — Lathrop GPM LLP

(57) ABSTRACT

Combining allowlist and blocklist support in data queries includes performing operations including obtaining a runtime query and extracting a set of runtime tuples from the runtime query. The operations further include processing the set of runtime tuples by an allowlist semantic comparator comparing the set of runtime tuples with an allowlist to obtain a first comparison result and by a blocklist semantic comparator comparing the set of runtime tuples with a blocklist to obtain a second comparison result. The blocklist semantic comparator performs an inverse comparison of the allowlist semantic comparator. The operations further include combining the first comparison result with the second comparison to form an access determination and executing the runtime query according to the access determination.

20 Claims, 6 Drawing Sheets

(56) References Cited

OTHER PUBLICATIONS

Durve, R., et al., "Windows 10 Security Hardening using Device Guard Whitelisting and AppLocker Blacklisting", 2017 Seventh International Conference on Emerging Security Technologies, Jan. 1, 2017, 6 pages.

Cui, W., et al., "A New Contrastive Learning Framework for Reducing the Effect of Heard Negatives", Knowledge-Based Systems, 260, Article 110121. https://doi.org/10.1016/j.knosys.2022.110121, 41 pages.

Zuo, C., et al., "SPINE: Scaling up Programming-by-negative Example for String Filtering and Transformation", SIGMOD'22, Jun. 12-17, 2022, 10 pages.

Potluri, T., et al., "Secure Software Development in Google Colab", 2023 IEEE World AI IoT Congress, Jan. 1, 2023, 5 pages.

Li, L., et al., "A Usability Test of Whitelist and Blacklist-based Anti-Phishing Application", Oct. 3-5, 2012, 8 pages.

Kim, D., et al., "Blacklist vs. Whitelist-Based Ransomware Solutions", IEEE Consumer Electronics Magazine, Jan. 1, 2019, 7 pages.

* cited by examiner

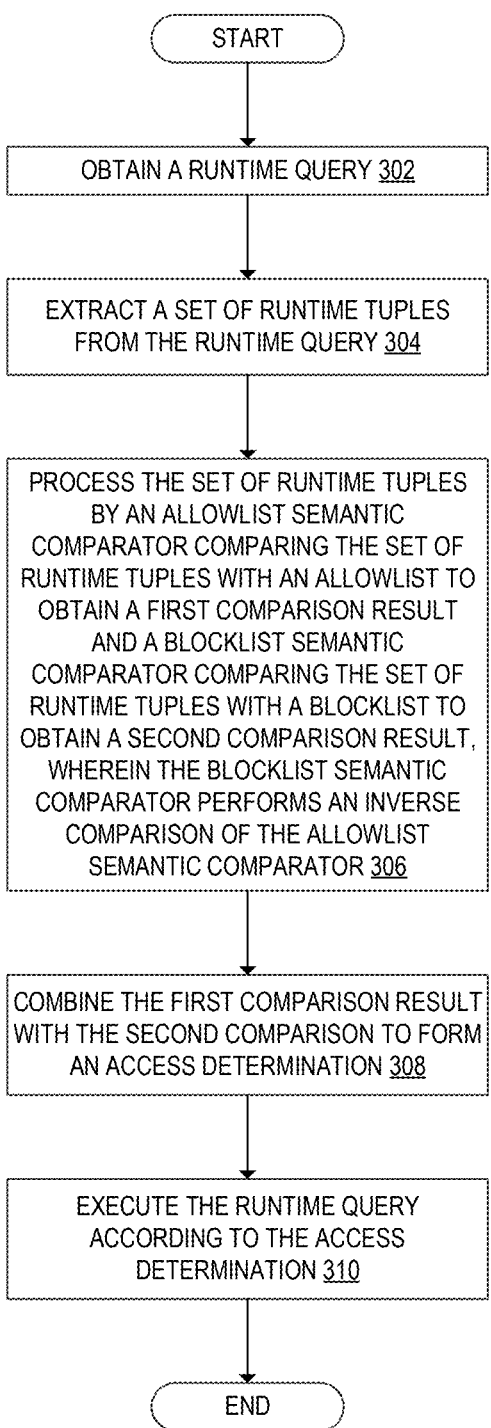

START

OBTAIN A RUNTIME QUERY 302

EXTRACT A SET OF RUNTIME TUPLES
FROM THE RUNTIME QUERY 304

PROCESS THE SET OF RUNTIME TUPLES
BY AN ALLOWLIST SEMANTIC
COMPARATOR COMPARING THE SET OF
RUNTIME TUPLES WITH AN ALLOWLIST TO
OBTAIN A FIRST COMPARISON RESULT
AND A BLOCKLIST SEMANTIC
COMPARATOR COMPARING THE SET OF
RUNTIME TUPLES WITH A BLOCKLIST TO
OBTAIN A SECOND COMPARISON RESULT,
WHEREIN THE BLOCKLIST SEMANTIC
COMPARATOR PERFORMS AN INVERSE
COMPARISON OF THE ALLOWLIST
SEMANTIC COMPARATOR 306

COMBINE THE FIRST COMPARISON RESULT
WITH THE SECOND COMPARISON TO FORM
AN ACCESS DETERMINATION 308

EXECUTE THE RUNTIME QUERY
ACCORDING TO THE ACCESS
DETERMINATION 310

END

*FIG. 3*

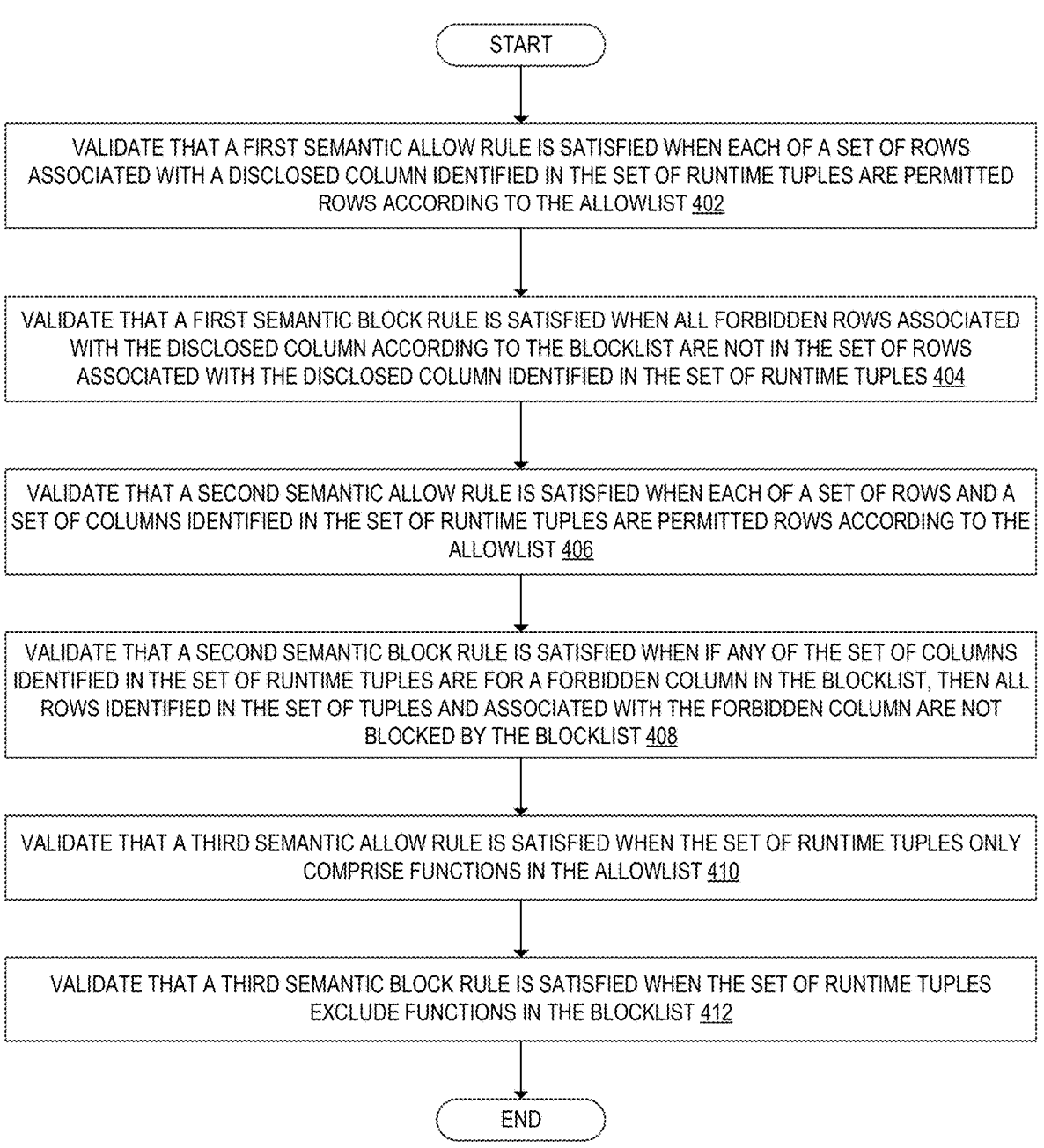

START

VALIDATE THAT A FIRST SEMANTIC ALLOW RULE IS SATISFIED WHEN EACH OF A SET OF ROWS ASSOCIATED WITH A DISCLOSED COLUMN IDENTIFIED IN THE SET OF RUNTIME TUPLES ARE PERMITTED ROWS ACCORDING TO THE ALLOWLIST 402

VALIDATE THAT A FIRST SEMANTIC BLOCK RULE IS SATISFIED WHEN ALL FORBIDDEN ROWS ASSOCIATED WITH THE DISCLOSED COLUMN ACCORDING TO THE BLOCKLIST ARE NOT IN THE SET OF ROWS ASSOCIATED WITH THE DISCLOSED COLUMN IDENTIFIED IN THE SET OF RUNTIME TUPLES 404

VALIDATE THAT A SECOND SEMANTIC ALLOW RULE IS SATISFIED WHEN EACH OF A SET OF ROWS AND A SET OF COLUMNS IDENTIFIED IN THE SET OF RUNTIME TUPLES ARE PERMITTED ROWS ACCORDING TO THE ALLOWLIST 406

VALIDATE THAT A SECOND SEMANTIC BLOCK RULE IS SATISFIED WHEN IF ANY OF THE SET OF COLUMNS IDENTIFIED IN THE SET OF RUNTIME TUPLES ARE FOR A FORBIDDEN COLUMN IN THE BLOCKLIST, THEN ALL ROWS IDENTIFIED IN THE SET OF TUPLES AND ASSOCIATED WITH THE FORBIDDEN COLUMN ARE NOT BLOCKED BY THE BLOCKLIST 408

VALIDATE THAT A THIRD SEMANTIC ALLOW RULE IS SATISFIED WHEN THE SET OF RUNTIME TUPLES ONLY COMPRISE FUNCTIONS IN THE ALLOWLIST 410

VALIDATE THAT A THIRD SEMANTIC BLOCK RULE IS SATISFIED WHEN THE SET OF RUNTIME TUPLES EXCLUDE FUNCTIONS IN THE BLOCKLIST 412

END

| Table 1: The "members" table | | | | |
|---|---|---|---|---|
| 1 | 2 | 3 | 4 | 5 |
| fname | lname | ssn | dept | email |
| John | Adams | 123 | HR | j.adams@foo.com |
| John | Baker | 234 | HR | m.baker@bar.com |
| John | Lopez | 345 | Sales | j.lopez@foo.com |
| John | Zafar | 456 | Sales | a.zafar@bar.com |
| John | Patel | 567 | CEO | k.patel@baz.com |

COMBINING ALLOWLIST AND BLOCKLIST SUPPORT IN DATA QUERIES

BACKGROUND

Structured query language (SQL) queries are statements used in programming to interact with databases. The queries are employed to retrieve, manipulate, or manage data stored within a database system. The structured query language allows developers to communicate with databases using commands such as SELECT, INSERT, UPDATE, DELETE, etc., enabling tasks like fetching specific data, adding new records, modifying existing data, and removing entries.

Injection attacks pose a security concern within the realm of queries of databases. Injection attacks may occur when malicious actors exploit vulnerabilities in input fields of applications that use queries. By injecting specially crafted input, attackers can manipulate the structure of the queries to gain unauthorized access to a database, which can lead to unauthorized data retrieval, modification, deletion, etc., which may compromise the integrity and confidentiality of sensitive information.

Often securing a system is performed either using an allowlist or a blocklist, but not both. Allowlists define queries that should be allowed. If the allowlist is not created through generalization of allowed queries, then the allowlist may block queries that should not be blocked. If allowlists are created through generalization, then the allowlist may be overly broad and permit queries that receive confidential information. Blocklists are lists that define what should be blocked. Blocklists do not prevent from future or unknown attacks. Thus, problems exist in effectively securing a database while at the same time allowing access.

SUMMARY

In general, in one or more aspect, one or more embodiments relate to a method that includes obtaining a runtime query and extracting a set of runtime tuples from the runtime query. The method further includes processing the set of runtime tuples by an allowlist semantic comparator comparing the set of runtime tuples with an allowlist to obtain a first comparison result and by a blocklist semantic comparator comparing the set of runtime tuples with a blocklist to obtain a second comparison result. The blocklist semantic comparator performs an inverse comparison of the allowlist semantic comparator. The method further includes combining the first comparison result with the second comparison to form an access determination and executing the runtime query according to the access determination.

In general, in one or more aspect, one or more embodiments relate to a system that includes at least one processor and an application executing on the at least one process to perform operations comprising obtaining a runtime query and extracting a set of runtime tuples from the runtime query. The operations further include processing the set of runtime tuples by an allowlist semantic comparator comparing the set of runtime tuples with an allowlist to obtain a first comparison result and by a blocklist semantic comparator comparing the set of runtime tuples with a blocklist to obtain a second comparison result. The blocklist semantic comparator performs an inverse comparison of the allowlist semantic comparator. The operations further include combining the first comparison result with the second comparison to form an access determination and executing the runtime query according to the access determination.

In general, in one or more aspect, one or more embodiments relate to a non-transitory computer readable storage medium storing computer readable program code which, when executed by a processor, performs operations comprising operations comprising obtaining a runtime query and extracting a set of runtime tuples from the runtime query. The operations further include processing the set of runtime tuples by an allowlist semantic comparator comparing the set of runtime tuples with an allowlist to obtain a first comparison result and by a blocklist semantic comparator comparing the set of runtime tuples with a blocklist to obtain a second comparison result. The blocklist semantic comparator performs an inverse comparison of the allowlist semantic comparator. The operations further include combining the first comparison result with the second comparison to form an access determination and executing the runtime query according to the access determination.

Other aspects of the invention will be apparent from the following description and the appended claims.

BRIEF DESCRIPTION OF DRAWINGS

FIG. 3 shows a flowchart for permitting or blocking a runtime query in accordance with one or more embodiments.

FIG. 4 shows a flowchart for processing a runtime query in accordance with one or more embodiments.

FIG. 5 shows an example in accordance with one or more embodiments.

Like elements in the various Figures are denoted by like reference numerals for consistency.

DETAILED DESCRIPTION

In general, embodiments are directed to semantic processing of runtime queries using a combination of allowlists and blocklists to secure access to databases in a manner that is seamless to users and administrators. The combination of the allowlist with the blocklist is performed using respective allowlist and blocklist semantic comparators. The blocklist semantic comparator performs a semantic comparison with the blocklist that is inverse to the semantic comparison with the allowlist. The blocklist has a set of blocklist tuples that specify what is to be blocked, while the allowlist has a set of allowlist tuples that specify what is to be allowed.

In one or more embodiments, when a runtime query is received, a set of runtime tuples are extracted from the query. The runtime tuples are processed by the allowlist semantic comparator using an allowlist as well as a blocklist semantic comparator using an allowlist to obtain respective comparison results. The respective comparison results are combined to form an access determination that specifies whether access to the database should be allowed.

Figure 1:
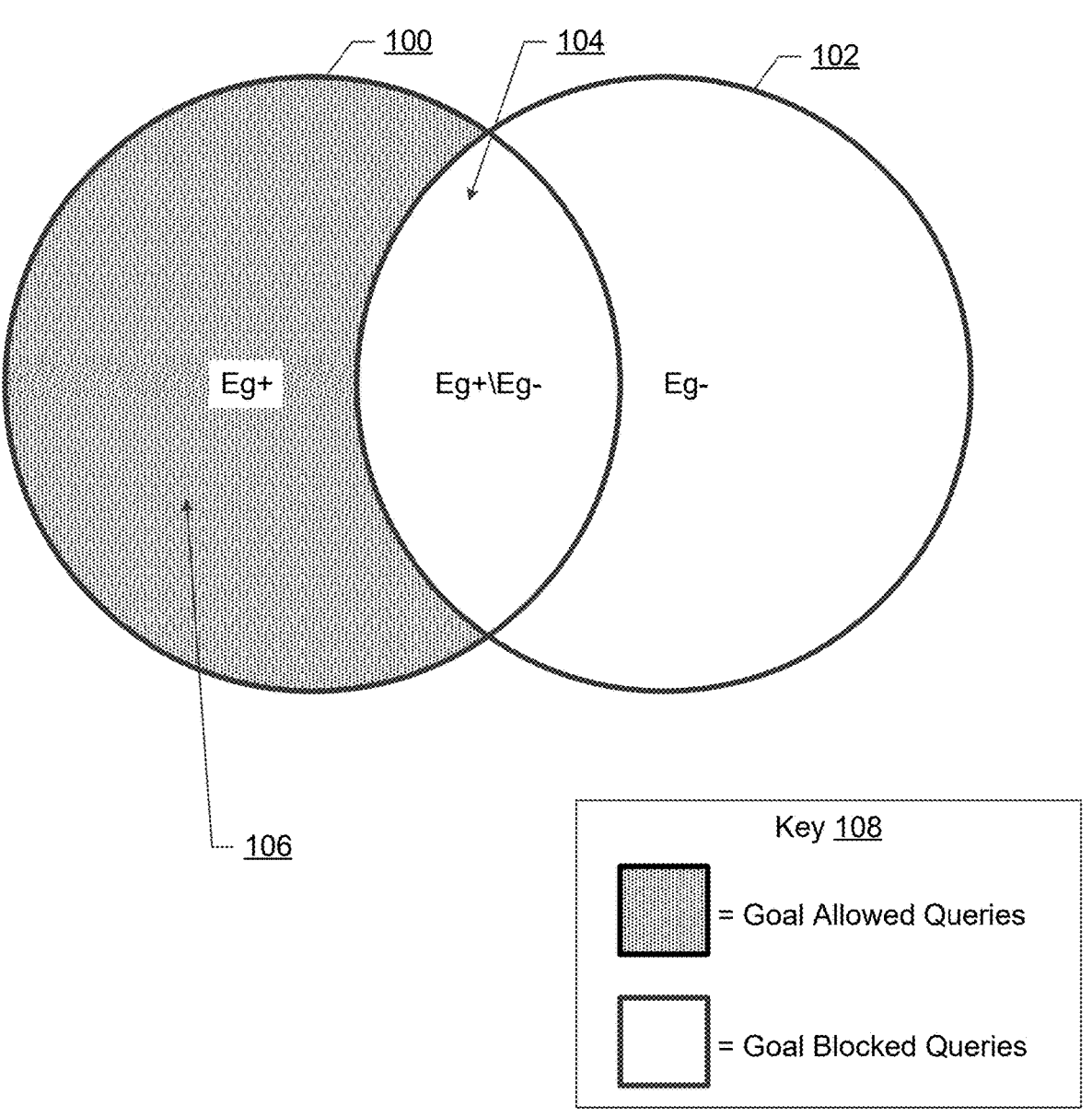
FIG. 1 shows an example of protections by an allowlist and a blocklist in accordance with one or more embodiments.

Turning to the figures, FIG. 1 shows an example of the protections by an allowlist and a blocklist. The Eg+ circle (100) is the entire circle that is allowed by an allowlist. The Eg– circle (102) is the entire circle that is blocked by the blocklist. As shown by two circles, the allowlist circle (100) and the blocklist circle (102) may overlap at the Eg+Eg– region (104). For example, a particular test case may be that a particular query, which would otherwise be allowable, should be blocked. Namely, the allowlist may have exploits that should be blocked. The exploits from the allowlist may be created by the allowlist and is generated through generalizing allowable queries. The purpose of the generalization is to reduce the storage space to store the allowlist queries and to reduce the latency in responding to a runtime query. Namely, it is faster to compare against a generalized query than to compare against multiple specific queries that would be generalized by the generalized query. Because of the generalization process, some queries that should not be allowable fall within the Eg+ circle. Thus, a goal of securing an application is to only allow the queries in the shaded region (106) of FIG. 1 as shown by key (108).

However, one way to specify whether a runtime query is allowable is to assert that the runtime query is allowable if it is allowed by the allowlist and not blocked by the blocklist. Such semantic based enforcement is based on enforcing the blocklist as a negation of the enforcement of the allowlist. A nefarious user, however, may add extraneous information to a blocklist query that is in Eg+\Eg−(104) space to circumvent such semantic based enforcement. For example, merely adding an extra function to an otherwise blocked query may cause a nefarious query to be executed.

To properly overcome the deficiency of performing semantic negation for enforcement, embodiments use an inverse enforcement of the blocklist as compared to the enforcement of the allowlist. In the inverse enforcement, the blocklist semantic comparator performs an inverse comparison with the blocklist as compared to the comparison using the allowlist. With the inverse comparison, adding extraneous information does not cause a blocked query to be allowable.

Figure 2:
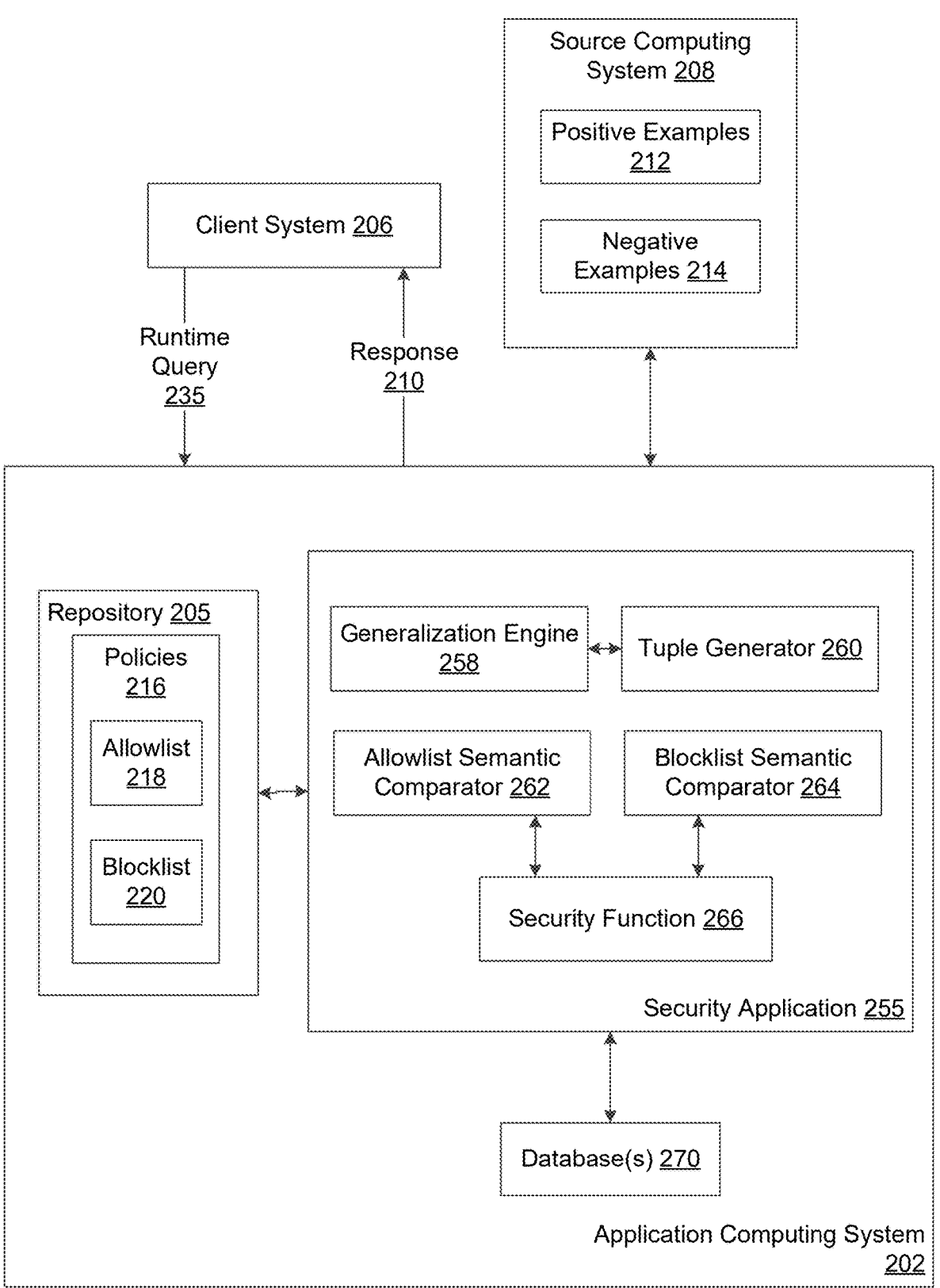
FIG. 2 shows a diagram of a system in accordance with one or more embodiments.

FIG. 2 shows a diagram of an application computing system (202) that performs the inverse comparison in accordance with one or more embodiments. As shown in FIG. 2, the application computing system (202) is connected to a client system (206) and a source computing system (208). The client system (206) is a computing system, such as described in reference to FIG. 6A and FIG. 6B that accesses the services of the application computing system (202). The client system (206) may be directly or indirectly communicatively connected to the application computing system (202). Multiple independent client systems may access the services of the application computing system (202). Further, one or more of the client systems may be malicious. The client system (206) is an originator of a runtime query (235).

The runtime queries (235) are queries for the databases (270) that are used to access the databases (270) during the runtime of an application. Specifically, the runtime query may request data based on a variety of parameters. The runtime queries (235) may be generated by the client system (206) and processed by the application computing system (202). After processing, the client system (206) may receive a response (210) from the application computing system (202). For example, the response (210) may be the requested information, the result of executing the runtime query (235), or a response indicating that the query is blocked.

The application computing system (202) is also connected to one or more source computing systems (208). The source computing system (208) is a computing system that is a source for positive examples (212) and negative examples (214). Generally, the examples (e.g., positive examples (212) and negative examples (214)) are a labeled dataset in which the labels are known and validated. Positive examples (212) are examples of queries or tuples (as described below) that are associated with an allow label and should be allowed to be executed. Negative examples (214) are examples of queries or tuples (as described below) that are related to a block label and should be prevented from being executed. The positive examples (212) and the negative examples (214) may be defined in a configuration file, provided by an administrator, or otherwise marked as being allowed or blocked.

The client system (206) and source computing system (208) are communicatively connected to an application computing system (202). The application computing system (202) may be a computing system, described in FIG. 6A and FIG. 6B, to secure access to the one or more databases (270).

The application computing system (202) includes the repository (205), the security application (255), and the database(s) (270).

The repository (205) is a type of storage unit and/or device (e.g., a file system, database, data structure, or any other storage mechanism) for storing data. The repository (205) may include multiple different, potentially heterogeneous, storage units and/or devices. The repository (205) stores data utilized by other components of the application computing system (202), including the security application (255). The data stored by the repository (205) includes policies (216), the allowlist (218), and a blocklist (220).

The policies (216) encompass various guidelines and rules that govern how the database(s) (270) is managed, accessed, and maintained. Implementing the policies (216) increases data security, integrity, and proper usage. The policies (216) may cover a wide range of areas, including data privacy, access controls, data retention, disaster recovery, etc. The policies (216) may vary based on the specific organization, industry, and regulatory requirements. The policies (216) are defined by the allowlist (218) and the blocklist (220).

The allowlist (218) and the blocklist (220) may have allowed queries or allowed tuples and blocked queries or blocked tuples, respectively, that are used to enumerate the access limits to the database(s) (270). Generally, a query is a string of text written in a structured query language (SQL). The allowlist (218) specifies the queries that are allowed, while the blocklist (220) specifies queries that should be blocked. For example, the allowed queries enumerate the queries that are allowed, while the blocked queries specify the queries that are blocked. In one or more embodiments, the allowed queries are generalized from multiple allowed queries. In such embodiments, the allowed queries may be referred to as allowed generalized queries or generalized queries.

Allowed tuples and blocked tuples are tuples extracted from the allowed queries and blocked queries, respectively. A tuple may include several components.

Within the allowed tuples of the allowlist (218), the components identify the columns of data that may be accessed in the database(s) (270), as well as the syntactic structures and functions that may be used to access or manipulate the data. Within the blocked tuples of the blocklist (220), the components identify the columns of data that may not be accessed in the database(s) (270), as well as the syntactic structures and functions that may not be used to access or manipulate the data. For example, the tuples (e.g., allowed tuples and blocked tuples) may include a disclosed component, an accessed component, a syntactic component, a function component, an alias component, etc., of the policy components.

A disclosed component of a tuple extracted from a query may identify a set of disclosed columns to access from the database(s) (270). In one embodiment, the disclosed columns are the columns that are identified in the query using a SELECT statement. The disclosed columns are the columns whose values will be retrieved and provided in the result of a query. A column is a particular attribute which may have multiple records, and a row corresponds to a particular record with particular attribute values of each attribute.

An accessed component of a tuple extracted from a query may identify data within a set of disclosed columns to access from the database(s) (270). The accessed columns may include the columns that are involved in the query, including columns used in conditions, joins, and calculations. The accessed columns may be displayed in the query result and may be used to filter, group, or manipulate the data displayed in the result of a query.

A syntactic component of a tuple extracted from a query may identify syntactic constructs within a query that are used to identify or process data from a set of disclosed columns. A syntactic construct is a statement written using a grammar and structure of the query language that may define how the various elements of the query should be arranged to communicate with the database and retrieve or manipulate data. A syntactic component may identify a subset of statements or clauses available in a query language. Examples of syntactic constructs identified by a syntactic component include the following statements and clauses:

FROM clause: specifies the table(s) from which data is retrieved. May be used as part of a SELECT statement.

WHERE clause: used to filter results based on specified conditions and may follow the FROM clause and precede the GROUP BY or ORDER BY clauses if present.

GROUP BY clause: used to group rows that have the same values in specified columns into summary rows, and may be used with aggregate functions like COUNT, SUM, AVG, etc.

HAVING clause: works in conjunction with GROUP BY and filters group results based on aggregate function results.

ORDER BY clause: specifies the order in which the query results should be presented and may follow the SELECT and FROM clauses.

A function component of a tuple extracted from a query may identify functions to be applied to data from a set of disclosed columns. A function is a predefined operation that can be applied to data in a database to perform calculations, transformations, manipulations, etc., of the data. Functions for query languages may be used to retrieve, format, and manipulate data during the processing of queries. Functions may be categorized into the following types:

Scalar functions: operate on a single value and return a single value. Examples include:

UPPER( ) and LOWER( ): convert text to uppercase or lowercase.

LEN( ) or LENGTH( ): calculate the length of a string.

CONCAT( ) or ||: concatenate strings.

ROUND( ) and FLOOR( ): perform rounding or floor operations on numbers.

DATEPART( ), YEAR( ), MONTH( ), etc.: extract date or time components from date/time values.

Aggregate functions: operate on a group of values and return a single value summarizing the group. May be used with the GROUP BY clause. Examples include:

COUNT( ): count the number of rows or non-null values in a column.

SUM( ): calculate the sum of values in a column.

AVG( ): calculate the average of values in a column.

MIN( ) and MAX( ): retrieve the minimum and maximum values in a column.

Date and time functions: manipulate and perform calculations with date and time values. Examples include:

GETDATE( ), CURRENT_TIMESTAMP: get the current date and time.

DATEADD( ): add a specific interval to a date.

DATEDIFF( ): calculate the difference between two dates.

String functions: operate on string values. Examples include:

SUBSTRING( ): extract a portion of a string.

CHARINDEX( ) or INSTR( ): find the position of a substring within a string.

REPLACE( ): replace occurrences of a substring with another string.

Conversion functions: convert values from one data type to another. Examples include:

CAST( ) and CONVERT( ): convert data types.

TO_DATE( ), TO_NUMBER( ), etc.: convert strings to specific data types.

Logical Functions: these functions evaluate logical conditions and return a Boolean result. Examples include:

IF( ), CASE: conditional expressions.

COALESCE( ): return the first non-null value in a list.

An alias component of a tuple extracted from a query may identify alias names (also referred to as aliases) for data or tables from the database(s) (270). Aliases provide temporary names to columns or tables in a query, making the output more readable and enabling the reference of columns or tables in a more concise manner. Aliases may be used with complex queries that involve multiple tables or calculations. For example, a column alias may identify a particular column from a set of disclosed columns, and a table alias may be used to identify a table of data from a database.

The runtime tuples are tuples generated from the runtime queries (235). The runtime tuples may be generated from the runtime queries (235) in the same manner as the allowed tuples and blocked tuples are generated from the allowed queries and blocked queries, respectively, and include the same or similar data and structures. The runtime components are components of the runtime tuples. The runtime components of the runtime tuples may include similar data and structures as with the allowed components and blocked components of the allowed tuples and blocked tuples.

Continuing with FIG. 2, the security application (255) is an application configured to control access to the database(s) (270). The security application (255) may be a standalone application or part of another application. The security application (255) may include a generalization engine (258), tuple generator (260), an allowlist semantic comparator (262), a blocklist semantic comparator (264), and a security function (266). The generalization engine (258) is configured to generalize the allowlist queries to create generalized queries. For example, if the allowed queries together access 85% of the rows of a particular column, then the generalization engine (258) may generalize an accessed column to include all rows of the accessed column. The generalization engine may similarly generalize allowed specific functions to general functions of a particular type.

The tuple generator (260) is the hardware or software components of the server application (255) that generate the allowlist tuples, the blocklist tuples, and the runtime tuples. The tuple generator (260) processes the examples (e.g., positive examples (212) and negative examples (214)) to extract the allowlist and blocklist tuples, respectively, and processes the runtime queries (235) to extract the runtime tuples.

The allowlist semantic comparator (262) is software that is configured to perform a semantic comparison between the runtime tuples with the allowlist to obtain a first comparison result. The blocklist semantic comparator (264) is configured to perform a semantic comparison between the blocklist to obtain a second comparison result. The security function (266) is configured to form access determinations based on the first comparison result and the second comparison result.

The database(s) (270) is a computing system that provides access to structured collections of data. Access to the database(s) (270) is gated by the security application (255).

While FIG. 2 shows a configuration of components, other configurations may be used without departing from the scope of the invention. For example, various components may be combined to create a single component. As another example, the functionality performed by a single component may be performed by two or more components.

FIG. 3 and FIG. 4 show flowcharts in accordance with one or more embodiments. While the various steps in these flowcharts are presented and described sequentially, at least some of the steps may be executed in different orders, may be combined or omitted, and at least some of the steps may be executed in parallel. Furthermore, the steps may be performed actively or passively.

FIG. 3 shows a flowchart for permitting or blocking a runtime query in accordance with one or more embodiments. In Block 302, a runtime query is obtained. For example, a runtime query may be received via a network interface or local interface by the security application. The runtime query may be received with metadata, such as metadata describing the user submitting the query, or one whose behalf the query is being processed. Responsive to the metadata and the corresponding runtime query, the corresponding allowlist and blocklist are obtained.

In Block 304, a set of runtime tuples are extracted from the runtime query. A runtime tuple may include one or more of a disclosed component, an accessed component, a syntactic component, a function component, and an alias component. Extracting the set of runtime tuples includes identifying a set of disclosed columns referenced by the runtime query and represented by a disclosed component of the runtime tuple. In one or more embodiments, the disclosed columns are the columns that are identified in the runtime query using a SELECT statement.

In one or more embodiments, extracting the set of runtime tuples includes identifying a set of accessed columns referenced by the runtime query and represented by the accessed component of the runtime tuple. The accessed columns may include the columns that are involved in the runtime query, including columns used in conditions, joins, and calculations to manipulate a result of the runtime query.

In one or more embodiments, extracting the set of runtime tuples includes identifying a set of syntactic constructs in the runtime query and represented by a syntactic component of the runtime tuple. The syntactic constructs within the runtime query are used to identify or process data from a set of disclosed columns.

In one or more embodiments, extracting the set of runtime tuples includes identifying a set of functions in the runtime query represented by the function component of the runtime tuple. The functions are operations and calculations to be applied to data from a set of disclosed columns.

In one or more embodiments, extracting the set of runtime tuples includes identifying a set of alias names in the runtime query represented by the alias component of the runtime tuple. The alias names (also referred to as aliases) are for data or tables from the databases.

In one or more embodiments, extracting the set of runtime tuples includes parsing the runtime query to generate a syntax tree. The syntax tree (also referred to as an abstract syntax tree (AST)), is a hierarchical representation of the syntactic structure of the runtime query. The syntax tree breaks down the query into smaller elements. The syntax tree captures the relationships between different parts of the query, including relationships between keywords, identifiers, operators, expressions, etc.

In one or more embodiments, extracting the set of runtime tuples includes computing an alias table from a syntax tree parsed from the runtime query. The alias table is a collection of aliases used in the runtime query to refer to columns or tables retrieved or constructed from a database.

In one or more embodiments, extracting the set of runtime tuples includes decomposing a syntax tree with an alias table to form an ordered list of operations. In one or more embodiments, the order of the ordered list puts the innermost statements from the runtime query at one side of the list (e.g., at the end or right side of the list) for subsequent processing.

In one or more embodiments, extracting the set of runtime tuples includes folding the ordered list of operations to form the runtime tuple. For example, the command "foldr" may be used to process elements of the list "from the right" (or from the tail) (representing the inner most portion of the runtime query) to pull the alias names from the text string of the runtime query into the alias component of a runtime tuple.

In Block 306, the set of runtime tuples are processed by an allowlist semantic comparator comparing the set of runtime tuples with an allowlist to obtain a first comparison result and a blocklist semantic comparator comparing the set of runtime tuples with a blocklist to obtain a second comparison result. The blocklist semantic comparator performs an inverse comparison of the allowlist semantic comparator. The allowlist semantic comparator sets the first comparison result to indicate that the set of runtime tuples is allowed when each of the semantic allow rules are satisfied. The blocklist semantic comparator sets the second comparison result to indicate that the set of runtime tuples is not blocked when each of the semantic block rules are satisfied. Notably, the blocklist semantic comparator does not determine the allowability of the runtime query. Rather, the blocklist semantic comparator determines whether the runtime query is not blocked. The blocklist semantic rules are the inverse of the allowlist semantic rules. A negation of the allowlist semantic rules would be that if the query satisfies the negation, then the query will be blocked. The inverse of the allowlist semantic rules is that if each of the inverse of the allowlist semantic rules are satisfied, then the query is not blocked. An example of processing the runtime tuples using the allowlist and the blocklist is presented in FIG. 4.

Continuing with FIG. 3, in Block 308, the first comparison result is combined with the second comparison to form an access determination. Combining the first comparison result with the second comparison to form the access determination includes the security function setting the access determination to allowed when the first comparison result indicates that the set of runtime tuples is allowed, and the second comparison result indicates that the set of runtime tuples is not blocked. Conversely, the security function sets the access determination to allowed when either the first comparison result indicates that the set of runtime tuples is not allowed, or the second comparison result indicates that the set of runtime tuples is blocked.

In Block 310, the runtime query is executed according to the access determination. When the access determination is set to allowed, the runtime query may be executed to generate a result that is returned as a response to the runtime query. When the access determination is set to blocked, the runtime query will not be executed, and it may be deleted. In some cases, an error message will be returned to the client system or may be logged.

FIG. 4 shows a flowchart for processing a runtime query in accordance with one or more embodiments. Specifically, FIG. 4 shows an example of the corresponding processing between the allowlist semantic comparator as compared to the blocklist semantic comparator. The application of rules in FIG. 4 are shown to match the semantic allow rule as compared to the inverse, namely, the semantic block rule.

In Block 402, the allowlist semantic comparator validates that a first semantic allow rule is satisfied when each of a set of rows associated with a disclosed column identified in the set of runtime tuples are permitted rows according to the allowlist. The disclosed columns in the runtime tuple are compared to the disclosed columns in the allowed tuples. If the disclosed column(s) in the runtime tuple are found or are a subset of the disclosed columns in the allowed tuples, then the corresponding semantic allow rule is satisfied. Otherwise, the corresponding semantic allow rule is not satisfied.

In Block 404, the blocklist semantic comparator validates that a first semantic block rule is satisfied when all forbidden rows associated with the disclosed column according to the blocklist are not in the set of rows associated with the disclosed column identified in the set of runtime tuples. The rows associated with the disclosed columns in the blocklist tuple are compared to the rows associated with the disclosed columns in the runtime tuple. If none of the rows of the disclosed column in the runtime tuple are in the rows of the disclosed column in the blocked tuples, then the corresponding semantic block rule is satisfied. Otherwise, the corresponding semantic block rule is not satisfied.

In Block 406, the allowlist semantic comparator validates that a second semantic allow rule is satisfied when each of a set of rows and a set of columns identified in the set of runtime tuples are permitted rows according to the allowlist. The accessed columns and accessed rows in the runtime tuple are compared to the accessed columns and accessed rows in the allowed tuples. If the accessed columns and rows in the runtime tuple are all found in or are a subset of the accessed columns and rows in the allowed tuples, then the corresponding semantic allow rule is satisfied. Otherwise, the corresponding semantic allow rule is not satisfied.

In Block 408, the blocklist semantic comparator validates that a second semantic block rule of the plurality of semantic block rules is satisfied when if any of the set of columns identified in the set of runtime tuples are for a forbidden column in the blocklist, then all rows identified in the set of tuples and associated with the forbidden column are not blocked by the blocklist. If the entire column is in the blocklist, then all rows associated with the column are in the blocklist. In such a scenario, the corresponding semantic rule is not satisfied if the column is accessed or disclosed. The comparison of Block 408 determines that if a particular column in the blocklist specifies that certain rows are blocked and the runtime tuple accesses the particular column, then the runtime tuple does not access the certain rows. If the runtime tuple does not access the certain rows of the particular column, or does not access the particular column in which all rows are blocked, the corresponding semantic block rule is satisfied. Otherwise, the corresponding semantic block rule is not satisfied.

In Block 410, the allowlist semantic comparator validates that a third semantic allow rule of the plurality of semantic allow rules is satisfied when the set of runtime tuples only comprise functions in the allowlist. Block 410 performs a function component comparison in tuples. If all of the functions in the runtime tuple is in the functions of the allowlist, then the corresponding semantic allow rule is satisfied. Otherwise, the corresponding semantic allow rule is not satisfied.

In Block 412, the blocklist semantic comparator validates that a third semantic block rule of the plurality of semantic block rules is satisfied when the set of runtime tuples exclude functions in the blocklist. Like Block 410, Block 412 performs a function comparison. If any of the functions in the runtime tuple is in the functions of the blocklist, then the corresponding semantic block rule is not satisfied. Otherwise, the corresponding semantic block rule is satisfied.

FIG. 4 is only an example of the semantic rules that may be enforced. As shown, the semantic blocklist rules are inverse of the semantic allowlist rules to perform the comparison with the blocklist as compared to the comparison with the allowlist.

To generate the allowlist, a set of allowed queries is received. The set of allowed tuples are accessed from the set of allowed queries. Extracting the set of allowed tuples may be performed as discussed above with reference to Block 304 of FIG. 3. The set of allowed tuples from the allowed query are generalized into a set of generalized tuples and added to the allowlist. Similarly, when a set of blocklist queries are received, a set of blocked tuples are extracted from the set of blocked queries. The set of blocked tuples are added to the blocklist. Thus, the system may be continually updated as new allowed queries and new blocked queries are received.

FIG. 5 shows an example in accordance with one or more embodiments. The following example is for explanatory purposes only and not intended to limit the scope of the invention. In the example, 3-tuples are used representing the predicate under which a disclosed column is disclosed, the access columns with the predicate associated with the access, and the set of functions that are called in the query. In the example, $d \rightarrow \langle p_1 \times (\{a, b\}, p_2), \{f\}\rangle$ indicates that, to disclose column d, predicate $p_1$ must hold, the columns a and b are accessed under predicate $p_2$ and the function $f$ is called. The above is the semantics of a query. Embodiments interpret the semantics differently for a positive example and for a negative example.

The following is the semantics for a positive example. Under definition 1, For a fixed d, let $\langle p_\phi, \langle p_A, p\varphi\rangle, \{p_f\}\rangle$ and $\langle q_\phi, \langle q_A, q_\varphi\rangle, \{q_f\}\rangle$ represent the allowlist and the incoming query respectively. For the query to be accepted by the allowlist all the following conditions must hold:

1. $q_\phi \rightarrow p_\phi$ (i.e., only permitted rows associated with the disclosed column in the runtime query are actually disclosed).
2. $q_A \subseteq p_A \wedge q\varphi \rightarrow p_\varphi$ (i.e., columns and rows not in the allowlist are not accessed by the runtime query).
3. $q_f \subseteq p_f$ (i.e., the runtime query does not call functions which are not in the allowlist).

By way of notation, $q \models p$, where q is the incoming query and p is the allowlist (or policy), when for each disclosed column, the above three properties are true.

The most obvious way to represent a negative example is to negate the above semantics, i.e., use logical negation. Therefore, the desired behavior would be $q \not\models p_n$, where $p_n$ represents the negative example. The logical way to define $\not\models$ is if one of the three conditions were false because $\models$ is the conjunction of the three conditions. However, as shown by the following example, this is not robust from a security perspective.

Let the previous example, $d \rightarrow \langle p_1 \times \langle \{a, b\}, p_2 \rangle, \{f\} \rangle$ be now the blocklist. Let the incoming query be $d \rightarrow \langle p_1 \times \langle \{a, b\}, p_2 \rangle, \{f,g\} \rangle$. Since only one of the conditions needs to be false in the standard negation-based semantics, invoking the extra function g ensures that $\{f, g\} \subseteq \{f\}$. Hence, this query will not be blocked by the blocklist. Thus, a malicious user by adding extraneous information can circumvent the synthesized blocklist. From a security perspective, negative examples specify what should be never allowed and not as a negation of an allowlist. That is each condition in the positive example must be satisfied by an appropriate definition of being disallowed. In the above example, function $f$ should never be called. Hence, the negative example condition is that the functions in the incoming query must not have anything in common from the negative examples.

One or more embodiments generalize the above requirements for accessed columns to account for row abstraction. For example, insisting all columns mentioned in the negative examples should not be accessed is too strong. The predicates in the negative examples indicate which rows should not accessed. The other rows can be accessed provided the allowlist permits it.

FIG. 5 shows an example in accordance with one or more embodiments. In the example, the values shown in shaded cells of the table (500) are the negative examples. For the purposes of the example of FIG. 5, consider the scenario in which the allowlist is generalized to specify the entire table as being permitted. As shown in the example, because all the columns have at least one entry in a negative example, the negative examples effectively block all queries. However, a goal is to permit access to all rows that are not implied by the negative examples (i.e., the remaining values that are not in shaded columns). Namely, rows 1-4 (502) show the data that should be allowed. In the example, "fname" can be accessed provided the value is not equal to "Kira". Likewise, "dept" can be accessed provided the value is not equal to "HR" or "CEO."

Thus, the satisfaction of negative examples may be specified using similar notation to the notation that describes the semantics of positive examples.

Under definition 2, for a fixed d, let $\langle p_\phi, \langle p_A, p_\phi \rangle, \{p_f\} \rangle$ and $\langle q_\phi, \langle q_A, q_\phi \rangle, \{q_f\} \rangle$ represent the blocklist and the incoming query, respectively. For the query to be passable by the blocklist all the following conditions must hold:

1. $q_\phi \rightarrow \neg p_\phi$ (i.e., all forbidden rows associated with the disclosed column are not disclosed).
2. $((q_A \cap p_A \neq \varnothing) \rightarrow (q_\phi \rightarrow \neg p_\phi)) \vee (q_a \cap p_a = \varnothing)$ (i.e., that is, the runtime query does not access any forbidden columns. However, if the runtime query does have forbidden columns, the runtime query then only accesses the rows not blocked by the negative example.)
3. $q_f \cap p_f = \varnothing$ (i.e., the runtime query does not call functions which are in the blocklist).

Satisfaction of a negative example may be represented as $q = \models p$ where q is the incoming query and p is the blocklist generated from negative examples. Therefore, given the allowlist $p_a$ and the blocklist $p_b$, a runtime query q is permitted if and only if $q \models p_a \wedge q = \models p_b$. In general, given the n-tuple semantics, $\models_i$ and $=\models_i$ for each of the components of the n-tuples based on the semantics of the component. For instance, the logical specification 1 in Definition 1 represents 1=1, while logical specification 1 in Definition 2 represents$=\models_1$. Similarly, the specification 3 in Definition 1 represents $\models_3$, while the specification 3 in Definition 2 represents$=\models_3$.

As shown, one or more embodiments formalize how negative examples interact with positive examples in a robust fashion that is not present in logical negation.

Figure 6A:
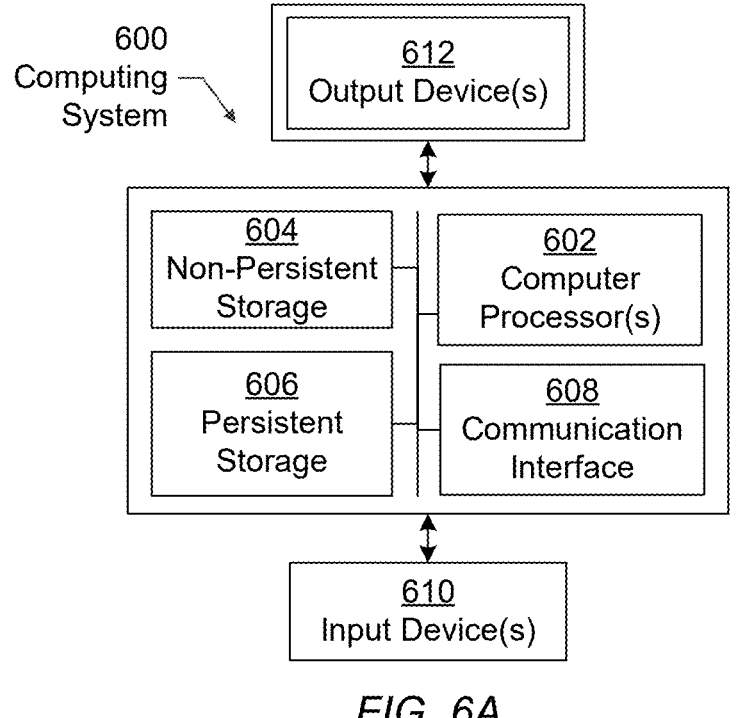
FIGS. 6A and 6B show a computing system in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processor(s) (602), non-persistent storage (604), persistent storage (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores or micro-cores of a processor. The computer processor(s) (602) includes one or more processors. The one or more processors may include a central processing unit (CPU), a graphics processing unit (GPU), a tensor processing unit (TPU), combinations thereof, etc.

The input devices (610) may include a touchscreen, keyboard, mouse, microphone, touchpad, electronic pen, or any other type of input device. The input devices (610) may receive inputs from a user that are responsive to data, and messages presented by the output devices (612). The inputs may include text input, audio input, video input, etc., which may be processed and transmitted by the computing system (600) in accordance with the disclosure. The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output device(s) (612) may include a display device, a printer, external storage, or any other output device. One or more of the output device(s) (612) may be the same or different from the input device(s) (610). The input (610) and output device(s) (612) may be locally or remotely connected to the computer processor(s) (602). Many different types of computing systems exist, and the aforementioned input (610) and output device(s) (612) may take other forms. The output device(s) (612) may display data and messages that are transmitted and received by the computing system (600). The data and messages may include text, audio, video, etc., and include the data and messages described above in the other Figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other Figures of the disclosure.

Figure 6B:
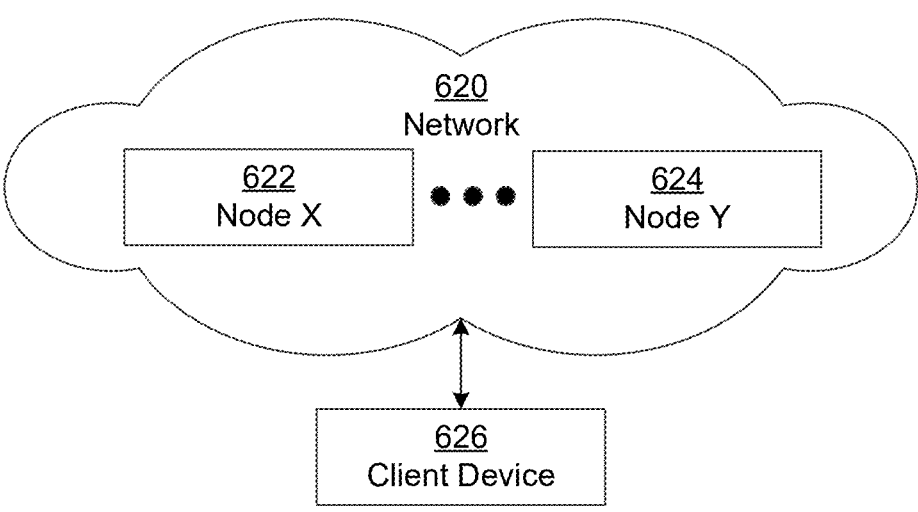

The computing system (600) in FIG. 6A may be connected to or be a part of a network. For example, as shown in FIG. 6B, the network (620) may include multiple nodes (e.g., node X (622) and node Y (624)). Each node may correspond to a computing system (600), such as the computing system shown in FIG. 6A, or a group of nodes combined may correspond to the computing system (600) shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626), including receiving requests and transmitting responses to the client device (626). For example, the nodes may be part of a cloud computing system. The client device (626) may be a computing system (600), such as the computing system shown in FIG. 6A. Further, the client device (626) may include and/or perform all or a portion of one or more embodiments.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or a semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    obtaining a runtime query;
    extracting a set of runtime tuples from the runtime query;
    processing the set of runtime tuples by an allowlist semantic comparator comparing the set of runtime tuples with an allowlist to obtain a first comparison result and by a blocklist semantic comparator comparing the set of runtime tuples with a blocklist to obtain a second comparison result, wherein the blocklist semantic comparator performs an inverse comparison of the allowlist semantic comparator;
    setting the first comparison result to indicate that the set of runtime tuples is allowed when each of a plurality of semantic allow rules are satisfied;
    combining the first comparison result with the second comparison result to form an access determination; and
    executing the runtime query according to the access determination.

2. The method of claim 1, wherein processing the set of runtime tuples comprises:
    setting the second comparison result to indicate that the set of runtime tuples is not blocked when each of a plurality of semantic block rules are satisfied.

3. The method of claim 2, wherein processing the set of runtime tuples comprises:
    validating that a semantic allow rule of the plurality of semantic allow rules is satisfied when each of a set of rows associated with a disclosed column identified in the set of runtime tuples are permitted rows according to the allowlist, and
    validating that a semantic block rule of the plurality of semantic block rules is satisfied when all forbidden rows associated with the disclosed column according to the blocklist are not in the set of rows associated with the disclosed column identified in the set of runtime tuples.

4. The method of claim 2, wherein processing the set of runtime tuples comprises:
    validating that a semantic allow rule of the plurality of semantic allow rules is satisfied when each of a set of rows and a set of columns identified in the set of runtime tuples are permitted rows according to the allowlist, and
    validating that a semantic block rule of the plurality of semantic block rules is satisfied when if any of the set of columns identified in the set of runtime tuples are for a forbidden column in the blocklist, then all rows identified in the set of tuples and associated with the forbidden column are not blocked by the blocklist.

5. The method of claim 2, wherein processing the set of runtime tuples comprises:

validating that a semantic allow rule of the plurality of semantic allow rules is satisfied when the set of runtime tuples only comprise functions in the allowlist, and validating that a semantic block rule of the plurality of semantic block rules is satisfied when the set of runtime tuples exclude functions in the blocklist.

6. The method of claim 1, further comprising:

receiving a set of allowed queries;

extracting a set of allowed tuples from the set of allowed queries;

generalizing the set of allowed tuples from the allowed query into a set of generalized tuples; and adding the set of generalized tuples to the allowlist.

7. The method of claim 1, further comprising:

receiving a set of blocked queries;

extracting a set of blocked tuples from the set of blocked queries; and adding the set of blocked tuples to the blocklist.

8. The method of claim 1, further comprising:

combining the first comparison result with the second comparison result to form the access determination comprises:

setting the access determination to allowed when the first comparison result indicates that the set of runtime tuples is allowed, and the second comparison result indicates that the set of runtime tuples is not blocked.

9. The method of claim 1, further comprising:

combining the first comparison result with the second comparison result to form the access determination comprises:

setting the access determination to allowed when at least one selected from the group consisting of the first comparison result indicates that the set of runtime tuples is not allowed, and the second comparison result indicates that the set of runtime tuples is blocked exists.

10. The method of claim 1, wherein the set of runtime tuples comprises a runtime tuple comprising one or more of a disclosed component, an accessed component, a syntactic component, a function component, and an alias component.

11. The method of claim 1, wherein extracting the set of runtime tuples comprises:

identifying a set of disclosed columns referenced by the runtime query and represented by a disclosed component of a runtime tuple of the set of runtime tuples, wherein the set of disclosed columns comprises a disclosed column selected by the runtime query.

12. The method of claim 1, wherein extracting the set of runtime tuples comprises:

identifying a set of accessed columns referenced by the runtime query and represented by an accessed component of a runtime tuple of the set of runtime tuples, wherein the set of accessed columns comprises an accessed column used to manipulate a result of the runtime query.

13. The method of claim 1, wherein extracting the set of runtime tuples comprises:

identifying a set of functions in the runtime query represented by a function component of a runtime tuple of the set of runtime tuples, wherein the set of functions comprises a function to be applied to data for a result from the runtime query.

14. A system comprising:

at least one processor; and an application executing on the at least one processor to perform operations comprising:

obtaining a runtime query, extracting a set of runtime tuples from the runtime query, processing the set of runtime tuples by an allowlist semantic comparator comparing the set of runtime tuples with an allowlist to obtain a first comparison result and by a blocklist semantic comparator comparing the set of runtime tuples with a blocklist to obtain a second comparison result, wherein the blocklist semantic comparator performs an inverse comparison of the allowlist semantic comparator, setting the first comparison result to indicate that the set of runtime tuples is allowed when each of a plurality of semantic allow rules are satisfied, combining the first comparison result with the second comparison result to form an access determination, and executing the runtime query according to the access determination.

15. The system of claim 14, wherein processing the set of runtime tuples comprises:

setting the second comparison result to indicate that the set of runtime tuples is not blocked when each of the plurality of semantic block rules are satisfied.

16. The system of claim 15, wherein:

the plurality of semantic allow rules comprises a semantic allow rule specifying that each of a set of rows associated with a disclosed column identified in the set of runtime tuples are permitted rows according to the allowlist, and the plurality of semantic block rules comprises a semantic block rule specifying that all forbidden rows associated with the disclosed column according to the blocklist are not in the set of rows associated with the disclosed column identified in the set of runtime tuples.

17. The system of claim 15, wherein:

the plurality of semantic allow rules comprises a semantic allow rule specifying that each of a set of rows and a set of columns identified in the set of runtime tuples are permitted rows according to the allowlist, and the plurality of semantic block rules comprises a semantic block rule specifying that if any of the set of columns identified in the set of runtime tuples are for a forbidden column in the blocklist, then all rows identified in the set of tuples and associated with the forbidden column are not blocked by the blocklist.

18. The system of claim 15, wherein:

the plurality of semantic allow rules comprises a semantic allow rule specifying that the set of runtime tuples only comprise functions in the allowlist, and the plurality of semantic block rules comprises a semantic block rule specifying that the set of runtime tuples exclude functions in the blocklist.

19. A non-transitory computer readable storage medium storing computer readable program code which, when executed by a processor, performs operations comprising:

obtaining a runtime query;

extracting a set of runtime tuples from the runtime query;

processing the set of runtime tuples by an allowlist semantic comparator comparing the set of runtime tuples with an allowlist to obtain a first comparison result and a blocklist semantic comparator comparing the set of runtime tuples with a blocklist to obtain a second comparison result, wherein the blocklist seman-
tic comparator performs an inverse comparison of the
allowlist semantic comparator;

setting the first comparison result to indicate that the set
of runtime tuples is allowed when each of a plurality of
semantic allow rules are satisfied;

combining the first comparison result with the second
comparison result to form an access determination; and executing the runtime query according to the access
determination.

20. The non-transitory computer readable storage medium
of claim 19, wherein processing the set of runtime tuples
comprises:

setting the second comparison result to indicate that the
set of runtime tuples is not blocked when each of the
plurality of semantic block rules are satisfied.

\* \* \* \* \*